United States Patent
Sellers (10) Patent No.: US 9,901,823 B1
(45) Date of Patent: *Feb. 27, 2018

(54) BATTLE ATTRIBUTE-BASED ARRANGEMENT OF MAP AREAS

(71) Applicant: Aftershock Services, Inc., San Ramon, CA (US)

(72) Inventor: Michael Sellers, Pacifica, CA (US)

(73) Assignee: Aftershock Services, Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,236

(22) Filed: Feb. 2, 2017

Related U.S. Application Data (63) Continuation of application No. 13/737,621, filed on Jan. 9, 2013, now Pat. No. 9,592,440.

(51) Int. Cl.
*A63F 13/52* (2014.01)
*A63F 13/35* (2014.01)
*A63F 13/335* (2014.01)
*A63F 13/80* (2014.01)

(52) U.S. Cl.
CPC ............ *A63F 13/52* (2014.09); *A63F 13/335* (2014.09); *A63F 13/35* (2014.09); *A63F 13/80* (2014.09)

(58) Field of Classification Search
USPC .............................................. 463/7, 8, 9, 10
See application file for complete search history.

(56) References Cited

U.S. PATENT DOCUMENTS

| | | |
|---|---|---|
| 5,813,913 A | 9/1998 | Berner |
| 7,846,024 B2 | 12/2010 | Graepel |
| 8,425,330 B1 | 4/2013 | Kislyi |
| 9,592,440 B1 * | 3/2017 | Sellers .................. A63F 13/005 |
| 2006/0030407 A1 | 2/2006 | Thayer |
| 2007/0060342 A1 | 3/2007 | Sakaguchi |
| 2007/0066400 A1 | 3/2007 | Kogo |
| 2011/0070940 A1 | 3/2011 | Jaffe |
| 2012/0079121 A1 | 3/2012 | Rapo |

\* cited by examiner

*Primary Examiner* — Dmitry Suhol
*Assistant Examiner* — Brandon Gray
(74) *Attorney, Agent, or Firm* — Sheppard Mullin Richter & Hampton LLP (57) ABSTRACT

An approach to facilitating battle-attribute-based arrangement of map areas is provided. Battle-related records that indicate battle attribute values associated with users of a game space may be maintained. Responsive to the battle attribute values associated with individual ones of the users corresponding to the battle attribute values associated with other ones of the users, generation of one or more secondary maps having secondary areas associated with the individual users that are arranged together with secondary areas associated with the other users may be initiated. For example, the secondary area associated with a first user and the secondary area associated with a second user may be arranged together in one of the secondary maps responsive to a first battle attribute value associated with the first user corresponding to a second battle attribute value associated with the second user.

22 Claims, 6 Drawing Sheets

BATTLE ATTRIBUTE-BASED ARRANGEMENT OF MAP AREAS

FIELD OF THE DISCLOSURE

This disclosure relates generally to battle-attribute-based arrangement of map areas.

BACKGROUND

In recent years, games have enabled users to develop their own areas (e.g., forts, cities, countries, etc.) within a game space by building structures in the their areas, growing a population in their areas, training armies to protect their areas or to attack other areas associated with other users, and/or performing other tasks related to area development. Generally, the user areas in typical games are associated with a static map, and user progress with respect to user level, attack power, defense strength, speed, and/or other battle attributes will vary among the users associated with those areas. As such, users with disparate battle attribute values may engage each other in player vs. player (PvP) combat, which may result in forts, cities, countries, and/or other areas of users with substantially lower battle attribute values than their neighboring users being frequently overrun by those neighboring users. Thus, over time, users having substantially lower battle attributes than their neighboring users may become less engaged in such typical games. Moreover, the static maps offered by typical games may become dull to users that are constantly at battle with the same surrounding areas and/or users.

SUMMARY

One aspect of the disclosure relates to a system configured to facilitate battle-attribute-based arrangement of map areas, in accordance with one or more implementations. In exemplary implementations, a game space may include one or more primary maps having areas that are associated with users of the game space. Generation of one or more secondary maps may be initiated such that the secondary maps may include secondary areas associated with individual ones of the users arranged together with secondary areas associated with other ones of the users responsive to battle attribute values associated with the individual users corresponding to battle attribute values associated with the other users. In certain implementations, the secondary maps may include battleground maps that place areas of users with corresponding battle attribute values together. In some implementations, such battleground maps may be of limited duration to enable the users of the battleground maps to interact with one another during the limited duration. In this way, battle-attribute-based arrangement of map areas may enable users having corresponding battle attribute values to interact with one another, alleviate issues associated with static maps of typical games, and/or provide other benefits.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate battle-attribute-based arrangement of map areas. The computer program modules may include one or more of a game module, a record manager module, a battle mode module, a corresponding determination module, and/or other modules. In some implementations, the client computing platforms may be configured to execute one or more computer program modules that are the same as or similar to the computer program modules of the server(s) to facilitate battle-attribute-based arrangement of map areas.

The game module may be configured to execute an instance of a game space. The game space may include users and primary maps having areas that are associated with the users. The users may include first and second users. The areas of the primary maps may include a first area associated with the first user and a second area associated with the second user. Other areas of the primary maps may include non-user controlled areas.

The record manager module may be configured to maintain battle-related records that indicate battle attribute values associated with the users. The battle-related records may include a first record indicating a first battle attribute value associated with the first user and a second record indicating a second battle attribute value associated with the second user.

The battle mode module may be configured to, responsive to the battle attribute values associated with individual ones of the users corresponding to the battle attribute values associated with other ones of the users, initiate generation of one or more secondary maps having secondary areas associated with the individual users that are arranged together with secondary areas associated with the other users. By way of example, the secondary area associated with the first user and the secondary area associated with the second user may be arranged together in one of the secondary maps responsive to the first battle attribute value associated with the first user corresponding to the second battle attribute value associated with the second user.

In certain implementations, the corresponding determination module may be configured to determine that the first battle attribute value corresponds to the second battle attribute value responsive to one or more of the first and second battle attribute values being within a predetermined category of values or the first and second battle attribute values being within a predetermined range from one another. Thus, the battle mode module may arrange the secondary area associated with the first user and the secondary area associated with the second user together in one of the secondary maps based on the first and second battle attribute values being within a predetermined category of values, the first and second battle attribute values being within a predetermined range from one another, and/or other criteria.

In certain implementations, the battle mode module may be configured such that the secondary area associated with the first user represents the first area of the primary maps and the secondary area associated with the second user represents the second area of the primary maps. In some implementations, characters, structures, items, and/or resources of the secondary area associated with the first user may represent characters, structures, items, and/or resources of the first area. Characters, structures, items, and/or resources of the secondary area associated with the second user may represent characters, structures, items, and/or resources of the second area.

In some implementations, the battle mode module may be configured such that the secondary maps exist for a limited duration with respect to a perception of the users of the game space. In various implementations, the battle mode module may be configured to modify the primary maps responsive to the users interacting with each other in the secondary areas. In some implementations, the battle mode module may be configured such that the primary maps are modified based on one or more of gains or losses incurred by the users while interacting with each other in the secondary areas.

In some implementations, the users of the game space may include third and fourth users along with the first and second users. The primary map of the game space may include a third area associated with the third user and a fourth area associated with the fourth user along with the first area associated with the first user and the second area associated with the second user. The battle-related records may include a third record indicating a third battle attribute value associated with the third user and a fourth record indicating a fourth battle attribute value associated with the fourth user along with the first record indicating the first battle attribute value associated with the first user and the second record indicating the second battle attribute value associated with the second user. The battle mode module may be configured such that the secondary area associated with the first user and the secondary area associated with the second user are arranged together in one of the secondary maps responsive to the first battle attribute value corresponding to the second battle attribute value, while the secondary area associated with the third user and the secondary area associated with the fourth user are arranged together in another one of the secondary maps responsive to the third battle attribute value corresponding to the fourth battle attribute value.

In some implementations, the battle mode module may be configured such that the secondary area associated with the first user and the secondary area associated with the second user are arranged in close proximity to each other in the one secondary map responsive to the first battle attribute value corresponding to the second battle attribute value.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
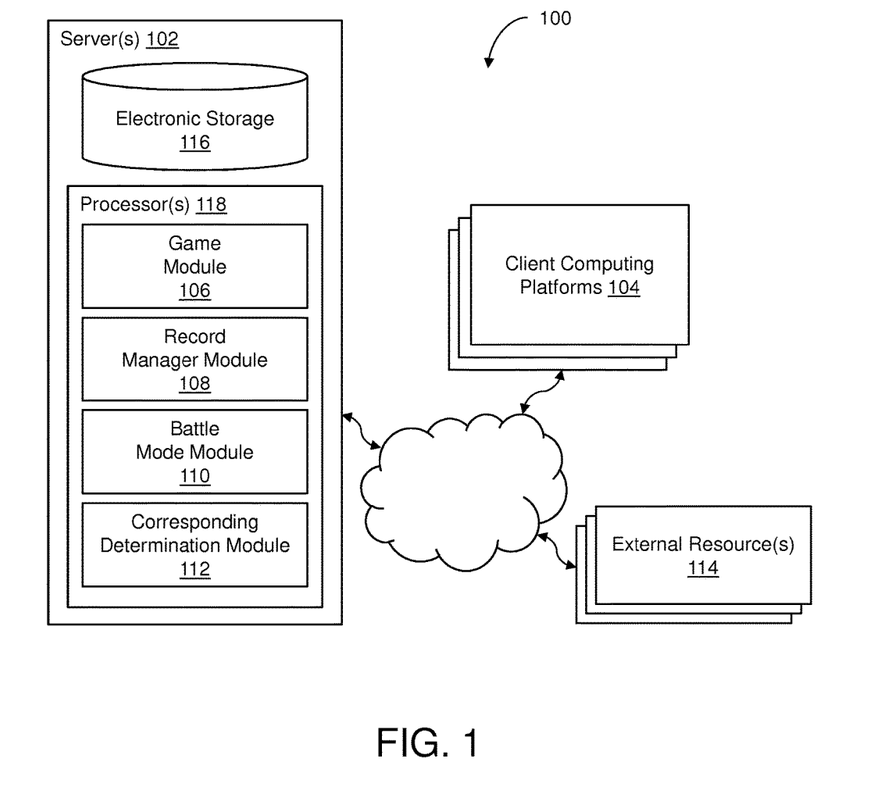
FIG. 1 illustrates a system configured to facilitate battle-attribute-based arrangement of map areas, in accordance with one or more implementations.

FIG. 1 illustrates a system 100 configured to facilitate battle-attribute-based arrangement of map areas, in accordance with one or more implementations. In exemplary implementations, a game space may include one or more primary maps having areas that are associated with users of the game space. Generation of one or more secondary maps may be initiated such that the secondary maps may include secondary areas associated with individual ones of the users arranged together with secondary areas associated with other ones of the users responsive to battle attribute values associated with the individual users corresponding to battle attribute values associated with the other users.

By way of example, the users of the game space may include first and second users. The areas of the primary maps may include a first area associated with the first user and a second area associated with the second user. In generating the secondary maps, the secondary area associated with the first user and the secondary area associated with the second user may be arranged together in one of the secondary maps responsive to a first battle attribute value associated with the first user corresponding to a second battle attribute value associated with the second user. In some implementations, the secondary area associated with the first user may represent the first area and the secondary area associated with the second user may represent the second area. In this way, battle-attribute-based arrangement of map areas may enable users having corresponding battle attribute values to interact with one another, alleviate issues associated with static maps of typical games, and/or provide other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate battle-attribute-based arrangement of map areas. The computer program modules may include one or more of a game module 106, a record manager module 108, a battle mode module 110, a corresponding determination module 112, and/or other modules. In some implementations, client computing platforms 104 may be configured to execute one or more computer program modules that are the same as or similar to the computer program modules of server(s) 102 to facilitate battle-attribute-based arrangement of map areas.

Game module 106 may be configured to execute an instance of a game space. In some implementations, the game space may be a virtual space. An instance of the game space may be an instance of the virtual space. An instance of the virtual space may be executed by computer modules to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user character being controlled by a user via client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with one another through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

Figure 2A:
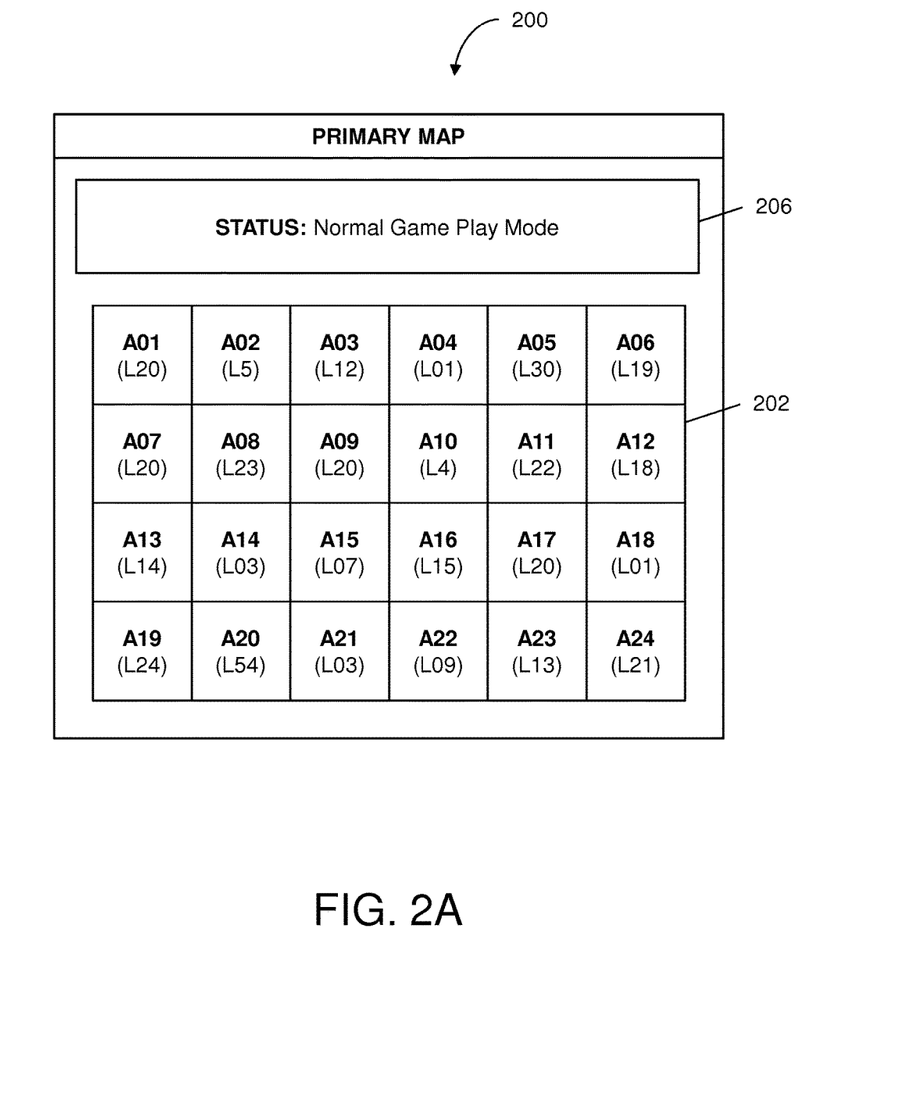
FIGS. 2A and 2B illustrate diagrams of a user interface depicting primary maps associated with a game space, in accordance with one or more implementations.
Figure 2B:
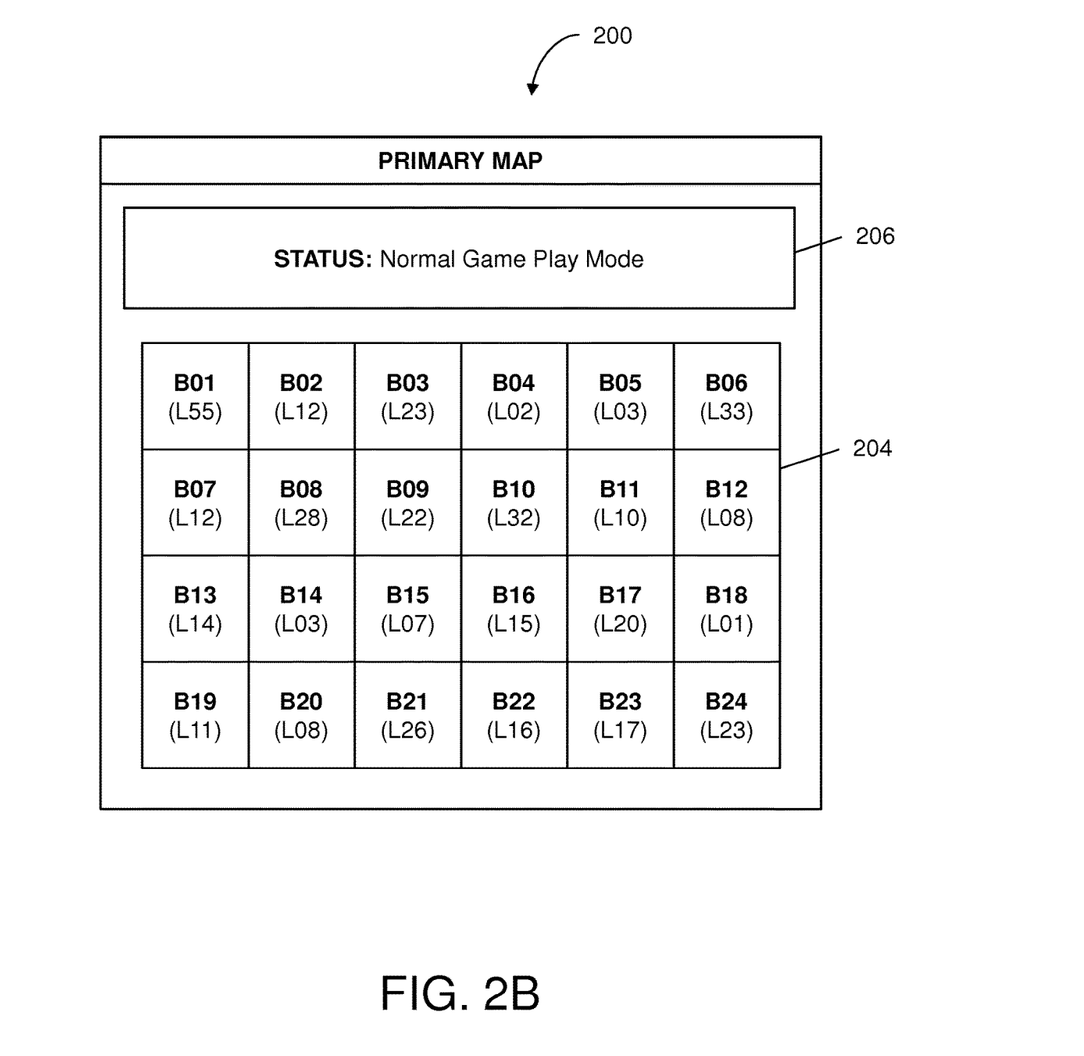

Game module 106 may be configured such that the game space includes users and primary maps having areas that are associated with the users. The users may include first and second users. The areas of the primary maps may include a first area associated with the first user and a second area associated with the second user. Other areas of the primary maps may include non-user controlled areas. Along these lines, FIGS. 2A and 2B illustrate diagrams of a user interface 200 depicting primary maps 202 and 204 associated with a game space, in accordance with one or more implementations. As depicted by status window 206 of FIGS. 2A and 2B, during normal game play mode, users of the game space may interact with one another based on the respective arrangements of the areas (e.g., areas A01-A24 and areas B01-B24) on primary maps 202 and 204. As shown by FIG. 2A, user A04 associated with area A04 is a user of a substantially lower level (e.g., level 1) than users of nearby areas on primary map 202. As illustrated by FIG. 2B, user B04 associated with area B04 is a user of a substantially lower level (e.g., level 2) than users of nearby areas on primary map 204. A lower level may, for instance, correlate with lower values of attack power, defense strength, speed, and/or other battle attributes. As indicated above, users such as users A04 and B04 may become less engaged over time if they are frequently overrun by users of nearby areas that are substantially more experienced or stronger.

Record manager module 108 may be configured to maintain battle-related records that indicate battle attribute values associated with the users. The battle-related records may include a first record indicating a first battle attribute value associated with the first user and a second record indicating a second battle attribute value associated with the second user. By way of example, battle attribute values associated with the users may include values for level, attack power, defense strength, speed, and/or other battle attributes associated with the users. A battle attribute associated with a user may, for instance, include a battle attribute of the user, a battle attribute of characters associated with the user, a battle attribute of one or more areas associated with the user, and/or other battle attribute associated with the user.

For example, as indicated by FIG. 2A, a battle-related record associated with user A01 may indicate that user A01 is a level-20 user, a battle-related record associated with user A02 may indicate that user A02 is a level-5 user, a battle-related record associated with user A03 may indicate that user A03 is a level-12 user, a battle-related record associated with user A04 may indicate that user A04 is a level-1 user, etc. As indicated by FIG. 2B, a battle-related record associated with user B01 may indicate that user B01 is a level-55 user, a battle-related record associated with user B02 may indicate that user B02 is a level-12 user, a battle-related record associated with user B03 may indicate that user B03 is a level-23 user, a battle-related record associated with user B04 may indicate that user B04 is a level-2 user, etc.

Battle mode module 110 may be configured to, responsive to the battle attribute values associated with individual ones of the users corresponding to the battle attribute values associated with other ones of the users, initiate generation of one or more secondary maps having secondary areas associated with the individual users that are arranged together with secondary areas associated with the other users. By way of example, the secondary area associated with the first user and the secondary area associated with the second user may be arranged together in one of the secondary maps responsive to the first battle attribute value associated with the first user corresponding to the second battle attribute value associated with the second user.

In certain implementations, corresponding determination module 112 may be configured to determine that the first battle attribute value corresponds to the second battle attribute value responsive to one or more of the first and second battle attribute values being within a predetermined category of values or the first and second battle attribute values being within a predetermined range from one another. Thus, battle mode module 110 may arrange the secondary area associated with the first user and the secondary area associated with the second user together in one of the secondary maps based on the first and second battle attribute values being within a predetermined category of values, the first and second battle attribute values being within a predetermined range from one another, and/or other criteria.

Figure 3A:
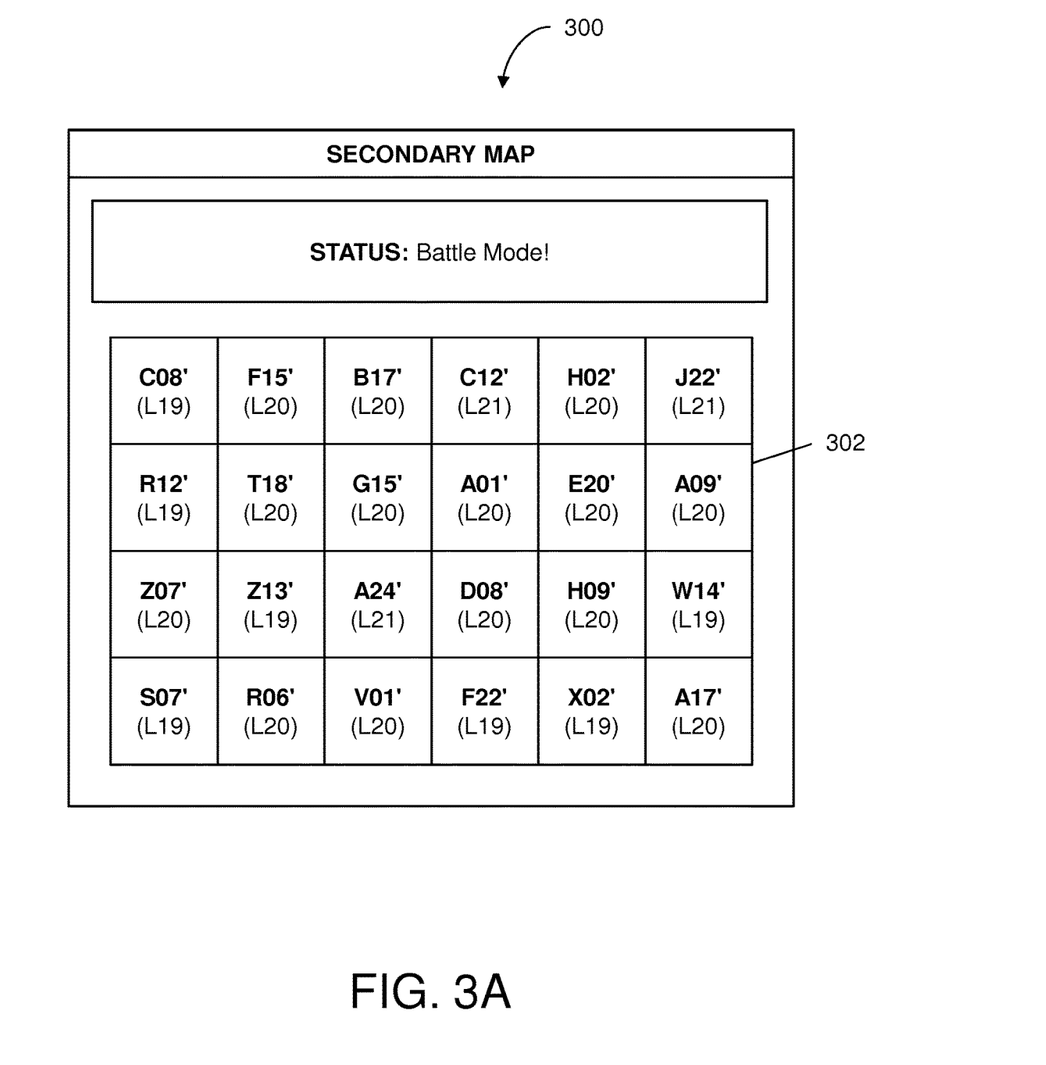
FIGS. 3A and 3B illustrate diagrams of a user interface depicting secondary maps associated with a game space, in accordance with one or more implementations.
Figure 3B:
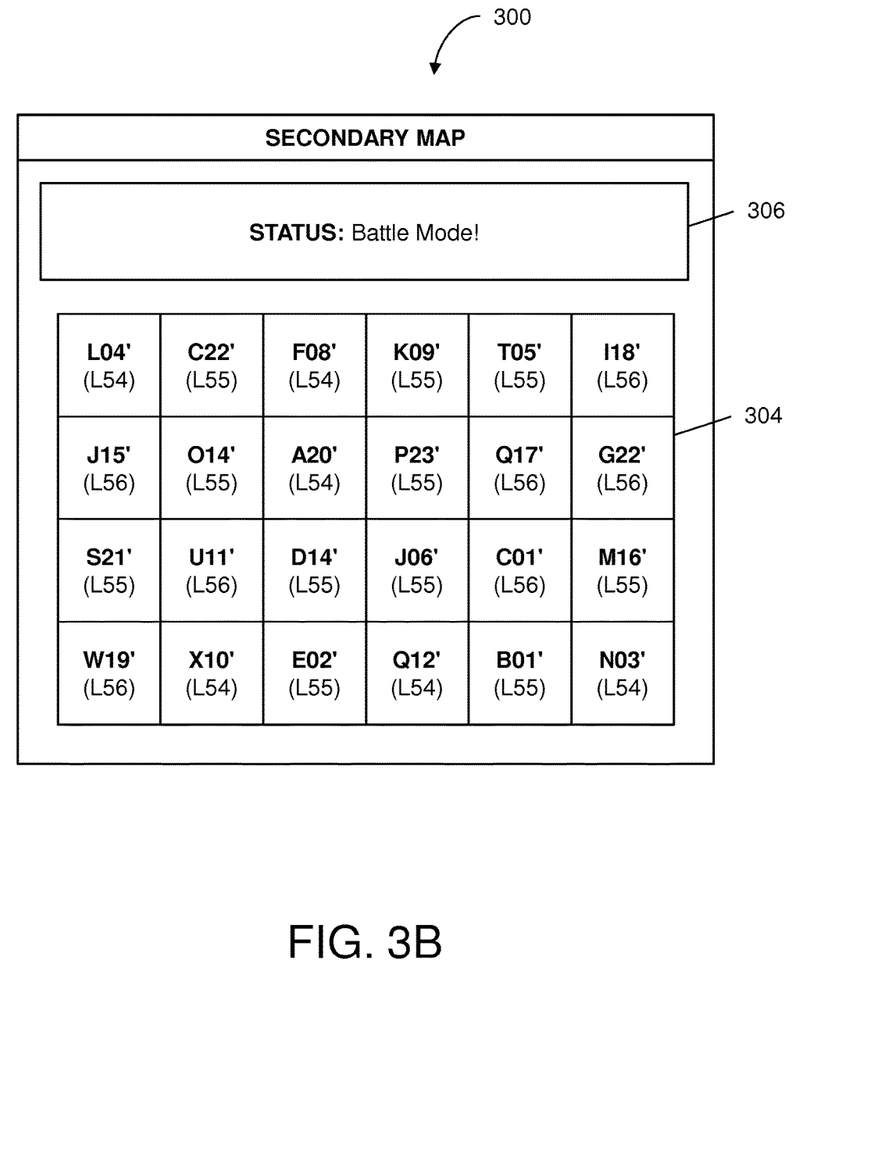

For example, FIGS. 3A and 3B illustrate diagrams of a user interface 300 depicting secondary maps 302 and 304 associated with a game space, in accordance with one or more implementations. As depicted by status window 306 of FIGS. 3A and 3B, users of the game space may interact with one another based on the respective arrangements of the secondary areas on secondary maps 302 and 304 during a battle mode. In one scenario, secondary map 302 includes secondary areas associated with users of levels 19-21 (e.g., the secondary areas associated with users A01, A09, A17, and A24 of primary map 202, the secondary area associated with user B17 of primary map 204, and/or the secondary areas associated with other users of other primary maps). Secondary map 302 may have been generated to include those secondary areas based on a determination that the associated users are within levels 19-21, a determination that the associated users are at most 2 levels apart, and/or other criteria.

In another scenario, secondary map 304 includes secondary areas associated with users of levels 54-56 (e.g., the secondary area associated with user A20 of primary map 202, the secondary area associated with user B01 of primary map 204, and/or the secondary areas associated with other users of other primary maps). Secondary map 302 may have been generated to include those secondary areas based on a determination that the associated users are within levels 54-56, a determination that the associated users are at most 2 levels apart, and/or other criteria. It should be noted that, in some implementations, secondary maps 302 and 304 may include secondary areas controlled by users and secondary areas that are not controlled by users.

In yet another scenario, the users of secondary map 302 may have no access or limited access to the secondary areas of secondary map 304. The users of secondary map 304 may have no access or limited access to the secondary areas of secondary map 302. For example, the users of secondary map 302 may not be enabled to attack the secondary areas of secondary map 304, and the users of secondary map 304 may not be enabled to attack the secondary areas of secondary map 302. In this way, users may interact with other users and/or with non-users of similar levels (e.g., by attacking, defending, stealing from, etc., the other users and/or the non-users) during at least the particular battle mode associated with secondary maps 302 and 304 without being overrun by users of substantially higher levels.

In certain implementations, battle mode module 110 may be configured such that the secondary area associated with the first user represents the first area of the primary maps and the secondary area associated with the second user represents the second area of the primary maps. In some implementations, characters, structures, items, and/or resources of the secondary area associated with the first user may represent characters, structures, items, and/or resources of the first area. Characters, structures, items, and/or resources of the secondary area associated with the second user may represent characters, structures, items, and/or resources of the second area. By way of example, referring to FIGS. 2A and 3A, secondary areas A01', A09', A17', and A24' of secondary map 302 may represent areas A01, A09, A17, and A24 of primary map 202, respectively. Referring to FIGS. 2B and 3B, secondary area B17' of secondary map 304 may represent area B17 of primary map 204. As another example, secondary areas A01', A09', A17', A24', and B'17 may be identical to areas A01, A09, A17, A24, and B17, respectively. In one use case, secondary areas A01', A09', A17', A24', and B'17 may include the same characters, structures, items, and/or resources as their respective areas A01, A09, A17, A24, and B17.

In some implementations, battle mode module 110 may be configured such that the secondary maps exist for a limited duration with respect to a perception of the users of the game space. In one scenario, different cities associated with the users may be added to new temporary "battleground" maps. These cities may be included together on a random basis subject to the users associated with the cities having corresponding battle attribute values. Thus, these battleground maps may allow for more balanced PvP combat among the users. Such PvP combat may include attempting to capture other users' cities of the battleground maps (e.g., by attacking the other users' cities, by capturing the structures of the other users' cities, by plundering items from the other users' cities, by taking over resources of the other users' cities, etc.) while defending their own cities of the battleground maps. After the limited duration, the users may be "warped" back to their cities as arranged by the primary maps associated with the users. In another scenario, cities and/or other areas captured by a user during the limited duration may be transferred to the capturing user's primary map. The captured cities and/or other captured areas may be placed manually by the user or automatically by battle mode module 110 and/or other modules.

Thus, in various implementations, battle mode module 110 may be configured to modify the primary maps responsive to the users interacting with each other in the secondary areas. In some implementations, battle mode module 110 may be configured such that the primary maps are modified based on one or more of gains or losses incurred by the users while interacting with each other in the secondary areas. As indicated above, in one use case, users may attempt to capture other users' cities of temporary battleground maps while defending their own cities of the battleground maps. Captured cities and/or other captured areas may be transferred to the capturing user's primary map. In another use case, characters, structures, items, and/or resources that are gained and/or loss during interactions among the users in the battleground maps may be reflected in the users' respective primary maps.

In certain implementations, battles or particular types of battles may be restricted to the secondary areas associated with the secondary maps such as battlegrounds associated with temporary battleground maps. In one use case, users may be notified that one or more of their cities may be vulnerable to attack according to user progress, a periodic basis, a predetermined schedule, and/or other criteria. Users may, for instance, be given an amount of time to prepare their cities for battle before their cities are "warped" to respective battlegrounds associated with the temporary battleground maps and the users can begin interacting with one another in the battlegrounds. In this way, since the users may be called to battle at any given time, the battlegrounds provided through the temporary battleground maps may offer an element of surprise to the user experience, resulting in increased engagement of the users. As indicated above, the battleground maps may be randomly generated subject to the users of the areas in the battlegrounds having corresponding battle attribute values. Such randomly-generated battleground maps may provide users with a dynamic feel to a game.

In some implementations, the users of the game space may include third and fourth users along with the first and second users. The primary map of the game space may include a third area associated with the third user and a fourth area associated with the fourth user along with the first area associated with the first user and the second area associated with the second user. The battle-related records may include a third record indicating a third battle attribute value associated with the third user and a fourth record indicating a fourth battle attribute value associated with the fourth user along with the first record indicating the first battle attribute value associated with the first user and the second record indicating the second battle attribute value associated with the second user. Battle mode module 110 may be configured such that the secondary area associated with the first user and the secondary area associated with the second user are arranged together in one of the secondary maps responsive to the first battle attribute value corresponding to the second battle attribute value, while the secondary area associated with the third user and the secondary area associated with the fourth user are arranged together in another one of the secondary maps responsive to the third battle attribute value corresponding to the fourth battle attribute value.

For example, with respect FIGS. 3A and 3B, user A01 may be the first user, user B17 may be the second user, user A20 may be the third user, and user B01 may be the fourth user. Secondary map 302 may be generated to include the secondary area A01' associated with user A01 and the secondary area B17' associated with user B17 responsive to a determination that the value of A01's level corresponds to the value of user B17's level (e.g., the values are within a predetermined category of values, the values are within a predetermined range from one another, etc.). Secondary map 304 may be generated to include the secondary area A20' associated with user A20 and the secondary area B01' associated with user B01 responsive to a determination that the value of A20's level corresponds to the value of user B01's level. Secondary map 302 may, for instance, be a battleground map of battlegrounds for users A01, users B17, and other users of levels 19-21. Secondary map 304 may be a battleground map of battlegrounds for users A20, users B01, and other users of levels 54-56. As indicated above, in one scenario, the users of secondary map 302 may not have access to the battlegrounds of secondary map 304, and the users of secondary map 304 may not have access to the battlegrounds of secondary map 302. In this way, battle-attribute-based arrangement of map areas may encourage competitiveness among the users since the battlegrounds of the secondary maps incentivizes the users to be prepared for an attack and/or other interactions from users of corresponding battle attribute values.

In some implementations, battle mode module 110 may be configured such that the secondary area associated with the first user and the secondary area associated with the second user are arranged in close proximity to each other in the one secondary map responsive to the first battle attribute value corresponding to the second battle attribute value. By way of example, in some use cases, users with the same and/or similar battle attribute values may be arranged closer together while users with disparate battle attribute values may be placed farther apart. As such, even in a secondary map that includes secondary areas associated users of disparate battle attribute levels, it may be less likely that users of low battle attribute levels are overrun by users of high battle attribute values. For example, users of high battle attribute values may be more likely to prepare their own defenses against other users of high battle attribute values (e.g., rather than attack users of low battle attribute levels) due to the secondary areas associated with users of high battle attribute values being proximately close to one another.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may include electronic storage media that electronically stores information. In some implementations, the electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 and/or client computing platforms 104 to function as described herein. It should be noted that, in certain implementations, electronic storage 116 may be a part of server(s) 102, a part of a given client computing platform 104, and/or a separate component of system 100.

In some implementations, processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 4:
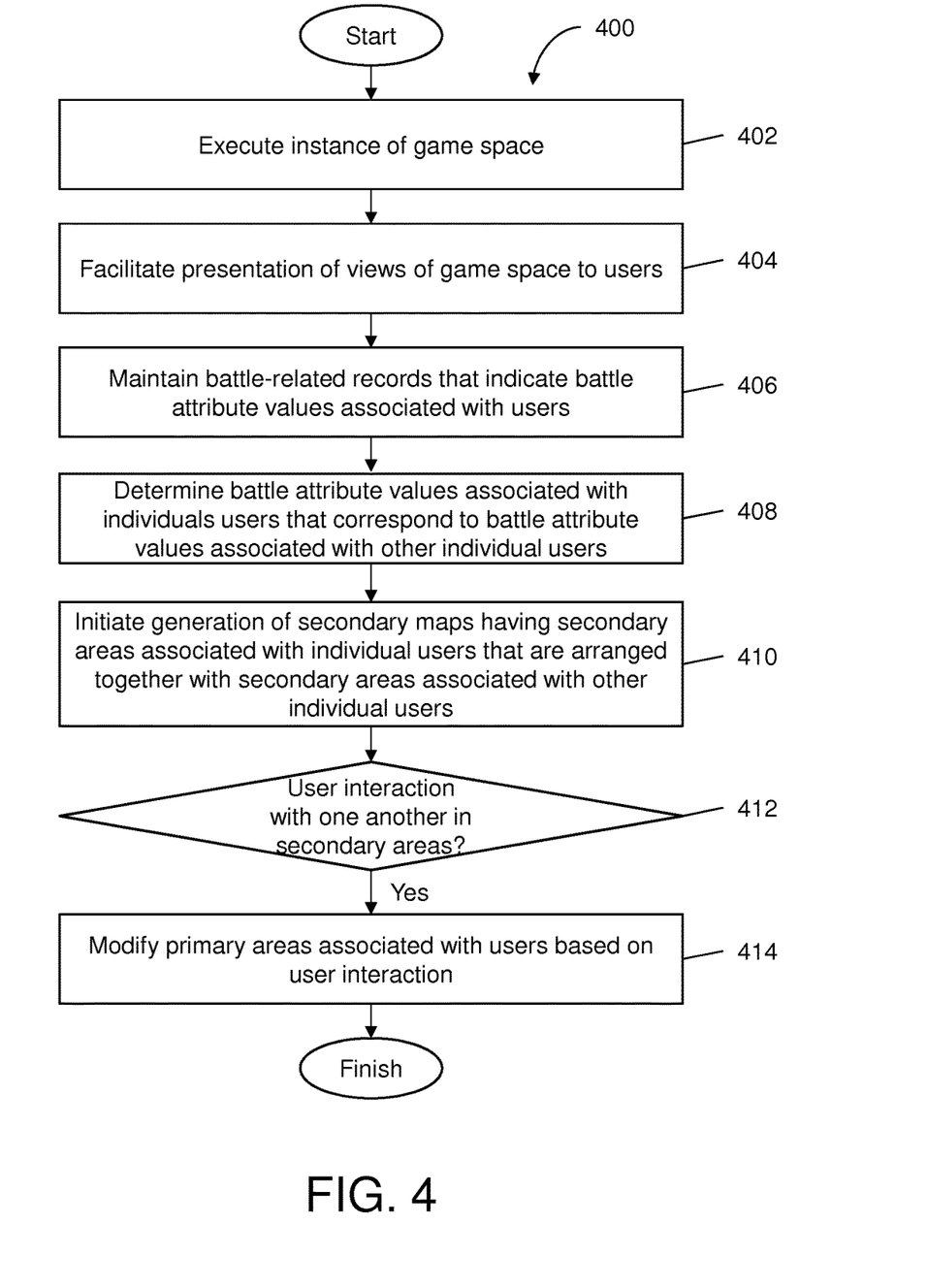
FIG. 4 illustrates a method for facilitating battle-attribute-based arrangement of map areas, in accordance with one or more implementations.

FIG. 4 illustrates a method for facilitating battle-attribute-based arrangement of map areas, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a game space may be executed. The game space may be configured to facilitate interaction of the users with the game space and/or each other by performing operations in the game space in response to commands received from the users. The game space may include one or more primary maps having areas that are associated with the users. The users may include first and second users. The areas may include a first area associated with the first user and a second area associated with the second user. Operation 402 may be performed by a game module that is the same as or similar to game module 106, in accordance with one or more implementations.

At an operation 404, presentation of views of the game space to users may be facilitated. For example, in some implementations, the game space may be a virtual space. An instance of the game space may be an instance of the virtual space. An instance of the virtual space may be executed by computer modules to determine views of the virtual space. The views may be communicated from one or more servers and/or other sources to client computing platforms associated with the users for presentation to the users. Operation 404 may be performed by a game module that is the same as or similar to game module 106, in accordance with one or more implementations.

At an operation 406, battle-related records that indicate battle attributes values associated with the users may be maintained. For example, the battle-related records may include a first record indicating a first battle attribute value associated with the first user and a second record indicating a second battle attribute value associate with the second user. Operation 406 may be performed by a record manager module that is the same as or similar to record manager module 108, in accordance with one or more implementations.

At an operation 408, the battle attribute values associated with individual ones of the users may be determined to correspond to battle attribute values associated with other ones of the users. For example, the first battle attribute value associated with the first user may be determined to correspond to the second battle attribute value associated with the second user. Operation 408 may be performed by a corresponding determination module that is the same as or similar to corresponding determination module 112, in accordance with one or more implementations.

At an operation 410, generation of one or more secondary maps having secondary areas associated with the individual users that are arranged together with secondary areas associated with the other users may be initiated. As shown, the generation of the secondary maps may be responsive to a determination that the battle attribute values associated with the individual users correspond to the battle attribute values associated with the other users. For example, the secondary area associated with the first user and the secondary area associated with the second user may be arranged together in one of the secondary maps responsive to a determination that the first battle attribute value associated with the first user corresponds to the second battle attribute value associated with the second user. Operation 410 may be performed by a battle mode module that is the same as or similar to battle mode module 110, in accordance with one or more implementations.

At an operation 412, a determination of whether certain user interactions of the users with one another in the secondary areas have occurred may be effectuated. Operation 412 may be performed by a battle mode module that is the same as or similar to battle mode module 110, in accordance with one or more implementations. Responsive to a determination that certain user interactions of the users with one another in the secondary areas have occurred, method 400 may proceed to an operation 414.

At operation 414, the primary maps associated with the users may be modified based on the user interactions in the secondary areas. For example, the primary maps may be modified based on one or more of gains or losses incurred by the users while interacting with each other in the secondary areas. Operation 414 may be performed by a battle mode module that is the same as or similar to battle mode module 110, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating battle-attribute-based arrangement of map areas, the system comprising:
   one or more processors configured by machine-readable instructions to:
      execute an instance of a game space, and to facilitate presentation of views of the game space to users, wherein the game space is configured to facilitate interaction of the users with the game space and/or each other by performing operations in the game space in response to commands received from the users, wherein the game space includes a primary map having areas that are associated with the users, wherein the users include a first user and a second user, wherein the areas include a first area associated with the first user and a second area associated with the second user, and wherein a first distance separates the first area from the second area in the primary map;
      maintain records that indicate values associated with the users, wherein the records include a first record indicating a first value associated with the first user and a second record indicating a second value associated with the second user; and
      generate a secondary map having secondary areas that are associated with the users, wherein the secondary areas include a first secondary area associated with the first user and a second secondary area associated with the second user, wherein a second distance separates the first secondary area from the second secondary area in the secondary map, wherein the first distance is different than the second distance, and wherein generation of the secondary map includes arrangement of the secondary areas based on the values associated with the users.

2. The system of claim 1, wherein the records are battle-related records, and wherein the values are battle attribute values.

3. The system of claim 1, wherein use by the users of the secondary map is temporary, and wherein the instance of the game space reverts to using the primary map subsequent to temporary use of the secondary map by the users.

4. The system of claim 1, wherein the first secondary area and the second secondary area are arranged together responsive to the first value corresponding to the second value.

5. The system of claim 1, wherein the users further include a third user, wherein the areas further include a third area associated with the third user, wherein a third distance separates the third area from the second area in the primary map, wherein the records include a third record indicating a third value associated with the third user, wherein the secondary areas include a third secondary area associated with the third user, wherein a fourth distance separates the third secondary area from the second secondary area in the secondary map,
   wherein, responsive to the second value being closer to the first value than to the third value, arrangement of the secondary areas is such that the second distance is smaller than the fourth distance, and
   wherein, responsive to the second value being closer to the third value than to the first value, arrangement of the secondary areas is such that the fourth distance is smaller than the second distance.

6. The system of claim 1, wherein the users further include a third user, wherein the areas further include a third area associated with the third user, wherein a third distance separates the third area from the second area in the primary map, wherein the records include a third record indicating a third value associated with the third user, wherein the secondary areas include a third secondary area associated with the third user, wherein a fourth distance separates the third secondary area from the second secondary area in the secondary map,
   wherein, responsive to the second value being closer to the first value than to the third value, arrangement of the secondary areas is such that the second distance is smaller than the first distance, and
   wherein, responsive to the second value being closer to the third value than to the first value, arrangement of the secondary areas is such that the fourth distance is smaller than the third distance.

7. The system of claim 1, wherein the one or more processors are configured by machine-readable instructions such that the secondary area associated with the first user represents the first area and the secondary area associated with the second user represents the second area.

8. The system of claim 7, wherein the one or more processors are configured by machine-readable instructions such that characters, structures, items, and/or resources of the secondary area associated with the first user represent characters, structures, items, and/or resources of the first area, and characters, structures, items, and/or resources of the secondary area associated with the second user represent characters, structures, items, and/or resources of the second area.

9. The system of claim 1, wherein the one or more processors are configured by machine-readable instructions to determine that the first value corresponds to the second value responsive to one or more of the first and second values being within a predetermined category of values or the first and second values being within a predetermined range from one another.

10. The system of claim 1, wherein the one or more processors are further configured by machine-readable instructions to modify the primary maps responsive to the users interacting with each other in the secondary areas.

11. The system of claim 10, wherein the one or more processors are further configured by machine-readable instructions such that the primary maps are modified based on one or more of gains or losses incurred by the users while interacting with each other in the secondary areas.

12. A method for facilitating battle-attribute-based arrangement of map areas, the method being implemented in a computer system that includes one or more processors configured by machine-readable instructions, the method comprising:
   executing an instance of a game space;
   facilitating presentation of views of the game space to users, wherein the game space facilitates interaction of the users with the game space and/or each other by performing operations in the game space in response to commands received from the users, wherein the game space includes a primary map having areas that are associated with the users, wherein the users include a first user and a second user, wherein the areas include a first area associated with the first user and a second area associated with the second user, and wherein a first distance separates the first area from the second area in the primary map;
   maintaining records that indicate values associated with the users, wherein the records include a first record indicating a first value associated with the first user and a second record indicating a second value associated with the second user; and
   generating a secondary map having secondary areas that are associated with the users, wherein the secondary areas include a first secondary area associated with the first user and a second secondary area associated with the second user, wherein a second distance separates the first secondary area from the second secondary area in the secondary map, wherein the first distance is different than the second distance, and wherein generating includes arranging the secondary areas based on the values associated with the users.

13. The method of claim 12, wherein the records are battle-related records, and wherein the values are battle attribute values.

14. The method of claim 12, wherein use by the users of the secondary map is temporary, the method further comprising:
   reverting to using the primary map subsequent to temporary use of the secondary map by the users in the instance of the game space.

15. The method of claim 12, wherein arranging includes arranging the first secondary area and the second secondary area together responsive to the first value corresponding to the second value.

16. The method of claim 12, wherein the users further include a third user, wherein the areas further include a third area associated with the third user, wherein a third distance separates the third area from the second area in the primary map, wherein the records include a third record indicating a third value associated with the third user, wherein the secondary areas include a third secondary area associated with the third user, wherein a fourth distance separates the third secondary area from the second secondary area in the secondary map, the method further comprising:
   responsive to the second value being closer to the first value than to the third value, arranging the secondary areas such that the second distance is smaller than the fourth distance, and
   responsive to the second value being closer to the third value than to the first value, arranging the secondary areas such that the fourth distance is smaller than the second distance.

17. The method of claim 12, wherein the users further include a third user, wherein the areas further include a third area associated with the third user, wherein a third distance separates the third area from the second area in the primary map, wherein the records include a third record indicating a third value associated with the third user, wherein the secondary areas include a third secondary area associated with the third user, wherein a fourth distance separates the third secondary area from the second secondary area in the secondary map, the method further comprising:
   responsive to the second value being closer to the first value than to the third value, arranging the secondary areas such that the second distance is smaller than the first distance, and
   responsive to the second value being closer to the third value than to the first value, arranging the secondary areas such that the fourth distance is smaller than the third distance.

18. The method of claim 12, wherein the secondary area associated with the first user represents the first area and the secondary area associated with the second user represents the second area.

19. The method of claim 18, wherein the characters, structures, items, and/or resources of the secondary area associated with the first user represent characters, structures, items, and/or resources of the first area, and characters, structures, items, and/or resources of the secondary area associated with the second user represent characters, structures, items, and/or resources of the second area.

20. The method of claim 12, further comprising:
   determining whether the first value corresponds to the second value responsive to one or more of the first and second values being within a predetermined category of values or the first and second values being within a predetermined range from one another.

21. The method of claim 12, further comprising:
   modifying the primary maps responsive to the users interacting with each other in the secondary areas.

22. The method of claim 21, wherein modifying the primary maps is based on one or more of gains or losses incurred by the users while interacting with each other in the secondary areas.

* * * * *